United States Patent
Koehler et al.

(10) Patent No.: US 8,512,912 B2
(45) Date of Patent: Aug. 20, 2013

(54) MEMBRANE-ELECTRODE UNIT FOR DIRECT METHANOL FUEL CELLS (DMFC)

(75) Inventors: Joachim Koehler, Gruendau/Haingruendau (DE); Sandra Wittpahl, Herzogenaurach (DE); Holger Dziallas, Grosskrotzenburg (DE); Christian Eickes, Frankfurt am Main (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 1242 days.

(21) Appl. No.: 11/569,461

(22) PCT Filed: May 25, 2005

(86) PCT No.: PCT/EP2005/005621
§ 371 (c)(1),
(2), (4) Date: Aug. 24, 2007

(87) PCT Pub. No.: WO2005/119821
PCT Pub. Date: Dec. 15, 2005

(65) Prior Publication Data
US 2007/0298312 A1 Dec. 27, 2007

(30) Foreign Application Priority Data
May 28, 2004 (EP) .................................. 04012745

(51) Int. Cl.
*H01M 4/02* (2006.01)
*H01M 4/36* (2006.01)

(52) U.S. Cl.
USPC .......................................... 429/523; 429/534

(58) Field of Classification Search
USPC ................................. 429/523, 534
See application file for complete search history.

(56) References Cited

U.S. PATENT DOCUMENTS

| | | | |
|---|---|---|---|
| 5,599,638 A | 2/1997 | Surampudi et al. | |
| 6,187,467 B1 | 2/2001 | Zhang et al. | |
| 6,221,523 B1 | 4/2001 | Chun et al. | |
| 6,296,964 B1 | 10/2001 | Ren et al. | |
| 6,766,817 B2 | 7/2004 | Da Silva | |
| 6,918,404 B2 | 7/2005 | Dias da Silva | |
| 7,066,586 B2 | 6/2006 | Da Silva | |
| 7,407,721 B2* | 8/2008 | Ren et al. | 429/431 |
| 2004/0209154 A1* | 10/2004 | Ren et al. | 429/44 |

FOREIGN PATENT DOCUMENTS

| | | |
|---|---|---|
| DE | 103 25 324 A1 | 12/2004 |
| EP | 0 880 188 A2 | 11/1998 |
| EP | 0 924 784 A1 | 6/1999 |
| EP | 1 266 687 A1 | 12/2002 |
| EP | 1 365 464 A2 | 11/2003 |
| EP | 1 403 949 A1 | 3/2004 |
| WO | WO 02/41433 A1 | 5/2002 |
| WO | WO 0241433 A1 * | 5/2002 |
| WO | WO 2004/091024 A1 | 10/2004 |
| WO | WO 2004/093231 A2 | 10/2004 |

OTHER PUBLICATIONS

Dillon, R. et al., "International activities in DMFC R&D: status of technologies and potential applications," Journal of Power Sources, 2004, pp. 112-126, vol. 127, Elsevier B.V., The Netherlands.
Kordesch, Karl et al., "Fuel Cells and Their Applications," 1996, VCH Verlagsgesellschaft mbH, Weinheim, Germany, and VCH Publishers, Inc., New York, NY.
Savadogo, O., "Emerging membranes for electrochemical systems: (I) solid polymer electrolyte membranes for fuel cell systems," Journal of New Materials for Electrochemical System I, 1998, pp. 47-66, Ecole Polytechnique de Montreal, Montreal, Canada.

* cited by examiner

*Primary Examiner* — Karie O'Neill Apicella
(74) *Attorney, Agent, or Firm* — Smith, Gambrell & Russell, LLP

(57) ABSTRACT

The invention relates to a membrane electrode unit (MEU) for electrochemical apparatuses, in particular for direct methanol fuel cells (DMFC). The membrane electrode unit contains backings (i.e. gas diffusion layers) on the anode side and cathode side, which have a different water tightness (WT). The anode backing must have a lower water tightness (i.e. a higher water permeability) than the cathode backing, where $WT_{Anode} < WT_{Cathode}$. The anode backing preferably has no compensating layer (microlayer), has a lower content of water repellent (from 2 to 10 wt.-%, based on the total weight) and has a higher total pore volume (VTot) than the cathode backing. The membrane electrode units produced have a substantially improved performance in DMFC fuel cells which are operated with aqueous methanol solution.

23 Claims, No Drawings

MEMBRANE-ELECTRODE UNIT FOR DIRECT METHANOL FUEL CELLS (DMFC)

Cross-Reference to Related Applications

This application claims the benefit of priority of European Application No. 04012745.8 filed May 28, 2004, and International Application No. PCT/EP2005/005621 filed May 25, 2005, which are relied on and incorporated herein by reference.

Introduction and Background

The invention relates to a membrane electrode unit for electrochemical apparatuses, in particular for direct methanol fuel cells (DMFC). The novel membrane electrode unit contains backings (i.e. gas diffusion layers) on the anode side and cathode side, which have a different water tightness (WT). They are preferably suitable for use in direct methanol fuel cells which are operated with dilute, aqueous methanol solutions and air.

Fuel cells convert a fuel and an oxidizing agent spatially separated from one another at two electrodes into power, heat and water. Hydrogen, hydrogen-rich gas or methanol may serve as fuel, and oxygen or air as oxidizing agent. The process of energy conversion in the fuel cell is distinguished by a particularly high efficiency. The technology of the fuel cells is described in detail in the literature, cf. K. Kordesch and G. Simader, "Fuel Cells and their Applications", VCH Verlag Chemie, Weinheim, 1996.

Owing to its low operating temperature, its compact design and its power density, the direct methanol fuel cell is particularly suitable for portable applications, for example as a replacement for accumulators and batteries. A fuel cell stack consists of a stacked arrangement (stack) of individual fuel cells, which in turn contain membrane electrode units between which so-called bipolar plates for gas supply and current conduction are arranged. For achieving a certain cell voltage, a large number of individual fuel cells can be stacked one behind the other. An overview of the current state of DMFC technology is to be found in R. Dillon, S. Srinivasan, A. S. Arico and V. Antonucci, J. Power Sources 127 (2004) 112-126.

In the DMFC, methanol and water (or an aqueous methanol solution) are reacted directly to give carbon dioxide ($CO_2$), water and electric power. If liquid methanol solution is used, the term "liquid feed" arrangement is used. Corresponding reactions in the DMFC are as follows:

| Anode: | $CH_3OH + H_2O$ | → | $CO_2 + 6H^+ + 6e-$ |
|---|---|---|---|
| Cathode: | $3/2\ O_2 + 6\ H^+ + 6e-$ | → | $3\ H_2O$ |
| Overall reaction: | $CH_3OH + 3/2\ O_2$ | → | $CO_2 + 2\ H_2O$ |

The heart of a DMFC fuel cell is a so-called Membrane Electrode Unit ("MEU"). The MEU consists of five layers: of the proton-conducting membrane (polymer electrolyte or ionomer membrane) in the middle, of the two gas diffusion layers (also referred to as GDLs or "backings") on the membrane sides, and the electrode layers present between the membrane and the gas diffusion layers. One of the electrode layers is formed as the anode for the oxidation of methanol and the other is formed as the cathode for the reduction of oxygen.

The backings or gas diffusion layers consist of porous, electrically conductive materials, such as, for example, metal nets, metal lattices, graphitized or carbonized carbon fibre papers, carbon fibre nonwovens or woven carbon fibre fabrics. The backings permit good access of the reactants to the electrodes and good conduction of the cell current. They are frequently treated with water repellents (for example water-repellent fluorine polymers, such as PTFE, PVDF or FEP).

Furthermore, the backings have, as a rule, a so-called compensating layer or "microlayer" consisting, for example, of a carbon black/PTFE mixture on one side (generally on the side which faces the electrode layer). This microlayer is present between the backing surface and the electrode layer and typically has a layer thickness of from about 5 to 50 micron.

For sealing and for better handling of the membrane electrode unit (MEU) during installation in the fuel cell stack, it may furthermore have sealing materials, protective films, reinforcements and/or rims.

The ion-conducting membrane consists of proton-conducting materials, so-called ionomers. A tetrafluoroethylene/fluorovinyl ether copolymer having acid functions, in particular sulpho groups, which is sold under the name Nafion® by DuPont, is preferably used. However, it is also possible to use other, in particular fluorine-free ionomer materials, such as sulphonated polyetherketones, sulphonated polyaryl ketones, doped polysulphones and doped polybenzimidazoles, as well as inorganic ionomers. Suitable ion-conducting membranes are described by O. Savadogo in "Journal of New Materials for Electrochemical Systems" I, 47-66 (1998). Membranes which have a reduced MeOH cross-over are preferably used for the DMFC.

The electrode layers for anode or cathode of the DMFC contain electrocatalysts which catalytically support the respective reaction (oxidation of methanol or reduction of oxygen). As the catalytically active component, a bimetallic platinum/ruthenium catalyst is preferably used on the anode, and preferably a platinum catalyst on the cathode side. Moreover, the catalysts may contain noble metals, such as palladium, rhodium, gold or combinations thereof. So-called supported catalysts (PtRu/C or Pt/C catalysts) in which the catalytically active platinum group metals were applied in finely divided form to the surface of a conductive support material, for example carbon black, are frequently used. However, it is also possible to use unsupported Pt and PtRu powders (so-called Pt or PtRu black). Suitable PtRu catalysts are described, for example, in EP 880 188 B1, EP 924 784 B1 and EP 1 266 687 A1. To date, the noble metal loadings of a DMFC-MEU are about 6 to 14 mg of $PtRu/cm^2$ on the anode and about 1 to 6 mg of $Pt/cm^2$ on the cathode.

For the broad commercial use of DMFC fuel cells in portable applications, a further improvement of the electrical power density and a substantial reduction of the system costs are necessary. The major problems in the development of DMFC fuel cell technology are therefore the excessively low power density to date (P, $W/cm^2$), the cross-over of the methanol through the membrane to the cathode side ("MeOH cross-over") and the high loading with noble metal-containing catalysts Considerable research efforts are currently being made worldwide in order to solve these problems. The prior art at present is summarized as follows:

U.S. Pat. No. 5,599,638 describes a liquid-feed DMFC. Gas diffusion layers or backings which are impregnated with an ionomer (preferably Nafion®) are used, and typical proportions of the impregnating agent are from 2 to 10% by weight of the gas diffusion layer.

U.S. Pat. No. 6,187,467 likewise discloses an impregnation of a backing with Nafion® for use in a DMFC. The electrocatalyst is, however, applied subsequently to the impregnated backing.

U.S. Pat. No. 6,221,523 describes the direct coating of the ionomer membrane with catalyst for the production of MEUs. Both electrode layers (both the anode layer and the cathode layer) are in direct contact with the membrane. Only thereafter are the gas diffusion layers, which have no catalyst coating, applied.

U.S. Pat. No. 6,296,964 proposes using especially thicker and/or less porous anode backings for reducing the MeOH permeability. In addition, particular diffusion plates for the anode side are described.

WO 02/41433 describes an air-breathing, passive DMFC which has a hydrophilic anode backing and a hydrophobic cathode backing. The aim is to minimize the water loss of the cell in the unmoistened mode and hence to improve the performance. The hydrophobic cathode backing is produced by impregnation with PTFE and, owing to capillary forces, forces the water of reaction back to the anode which, owing to its hydrophilic properties, stores said water. The hydrophilic properties of the anode are adjusted by impregnation with Nafion®.

Although the measures and proposals described in the prior art lead to improvements in performance, these are still insufficient for commercial use of DMFC (for example as a replacement for the Li ion battery in notebooks).

Summary of Invention

It was therefore an object of the present invention to achieve further improvements of the DMFC. In particular, it was intended to provide five-layer membrane electrode units (MEUs) for direct methanol fuel cells (DMFC) which have a high power density in combination with reduced noble metal consumption. This object is achieved by the provision of a membrane electrode unit according to the present invention, and the advantageous embodiments thereof.

In contrast to WO 02/41433, it was found that on their own the hydrophilic or hydrophobic properties of a backing are not decisive for improving the performance in the DMFC. Furthermore, the high or low content of water repellent is in itself not decisive. Rather, various parameters cooperate, and in particular, in addition to the content of water repellent, the total pore volume ($V_{Tot}$) and the presence of a compensating layer (microlayer) have a decisive effect with regard to the suitability of the backing. Further important factors are the backing type (for example woven or nonwoven materials), the material surface, the layer density and the thickness of the catalyst layer on the backing.

During the work, it has surprisingly been found that the properties of the backing which are relevant to the invention can best be described with the aid of the parameter of "water tightness" (WT). This specific parameter is known from the textile industry, a standardized method of determination existing (DIN EN 20811). Only by the introduction of this parameter has it become possible to define the present invention in a sufficient manner.

It was in fact found that the performance of a membrane electrode unit (MEU) for DMFC is substantially increased if backings having different water tightness ("WT") are used on the anode side and the cathode side. In particular, a backing which has a low water tightness (and hence a high water permeability) must be used on the anode side, while a backing having a high water tightness (and hence a low water permeability, must be used on the cathode side. This special combination of backings having different water tightness leads to a considerable improvement in performance of the DMFC-MEU. In comparison with the opposite backing combination, the power density (P in W/cm²) can be improved by more than a factor of 2. The observed effect is particularly striking during operation of the DMFC with dilute aqueous methanol solutions (in concentration ranges of from 0.01 to 5 mol/l), the flow rates preferably being from about 1 to 10 ml of MeOH/min. The "water tightness" (WT) is determined according to DIN EN 20811 in a hydrostatic pressure test.

The anode backings having low water tightness (i.e. high water permeability) preferably have a high total pore volume ($V_{Tot}$). They must have only a low content of water repellent. Preferably, the backings contain no compensating layer (microlayer). The total pore volume of the anode backing according to the invention ($V_{Tot}$)$_{Anode}$ is in the range from 2.5 to 4.5 ml/g. The content of water repellent is in the range from 2 to 10 wt.-% (based on the total weight).

The cathode backings exhibit a high water tightness (or low water permeability), advantageously have a compensating layer (microlayer) and have a lower total pore volume ($V_{Tot}$)$_{Cathode}$ which is in the range from 0.5 to 2.5 ml/g. Cathode backings have a higher content of water repellent in the range from 10 to 30 wt.-%, preferably in the range from 10 to 20 wt.-%(based on the total weight).

The five-layer membrane electrode unit (MEU) according to the invention for direct methanol fuel cells contains an ion-conducting membrane, at least one anode electrode layer, at least one cathode electrode layer, an anode backing applied to the anode side and a cathode backing applied to the cathode side, the anode backing having a lower water tightness (WT) than the cathode backing.

The electrode layers on anode side and cathode side of the MEU either can be applied directly to the ionomer membrane ("CCM" technology) or are present on the respective backing ("CCB" technology). Mixed forms in which one electrode layer is present on the backing and the other is present on the membrane are also possible (in this context, cf. German Patent Application DE 103 25 324.6). What is decisive for the improvement of the performance of the MEU according to the invention is the special combination of anode and cathode backings.

The measurement of the porosity is carried out with the aid of mercury porosimetry according to DIN 66133. Hg porosimetry permits the determination of the total pore volume ($V_{Tot}$) in porous solids from a pore size of about 2 nm. The micropores (pore diameter greater than 50 nm) and the mesopores (pore diameter in the range from 2 to 50 nm) are measured. The method gives an integral value for $V_{Tot}$ over the total pore size range.

The determination of the water tightness (WT) can be carried out by means of the hydrostatic pressure test according to DIN EN 20811. There, the water tightness is inversely proportional to the water permeability. A high water tightness of the gas diffusion layer therefore means that the backing has a low water permeability and retards or hinders water crossover.

The water tightness is assessed according to the hydrostatic pressure level with which a textile sheet-like structure opposes the penetration of water. A sample having an area of 100 cm² is subjected, under normal conditions, to a steadily increasing water pressure on one side until penetration occurs at three points. The hydrostatic pressure at which the water penetrates the sample corresponds to the measured value. The test is carried out with distilled water at a water temperature of (20±2)° C. The rate of increase of the water pressure is (10±10.5) cm water column/min. This is related to the pressure in millibar (1 cm water column ~1 mbar). The result obtained in this test method corresponds very well to the behaviour of thin sheet-like structures (such as, for example, of carbon fibre nonwovens) in an individual DMFC cell when they are exposed to a water pressure.

The results of these measurements are therefore applicable to the behaviour of the backings in DMFC fuel cells. Backings having a low water tightness (i.e. high water permeability) exhibit low pressure values in the range from 2 to 20 mbar, and layers having high water tightness (i.e. low water permeability) have higher pressure values in the range from 20 to 50 mbar.

As already described, particularly good performance values are achieved in the DMFC fuel cell if the anode backings have a lower water tightness than the cathode backings. The following relationship can therefore be set up for the membrane electrode units according to the invention with regard to the water tightness (WT; in mbar) and the quotient C:

$$WT_{Anode} < WT_{Cathode} \quad (1)$$

and furthermore $$C = WT_{Anode}/WT_{Cathode} < 1 \quad (2)$$

Typical values for the quotient C are in the range from 0.01 to 0.99, preferably in the range from 0.4 to 0.9.

The membrane electrode unit having the backing combination according to the invention shows, as a rule, an improvement of the power density (P; in mW/cm$^2$) by more than a factor of 2 compared with MEUs having the opposite arrangement of the backings (in this context, cf. table 1). The improvements of the DMFC which have been described are substantially independent of the type of electrocatalysts used and the ionomer membranes. Furthermore, the operating conditions of the DMFC fuel cell (stoichiometry, temperature, flow rates, etc.) are in principle without any great influence.

The causes of this improvement of performance are still not completely understood. A possible explanation is that an improved interaction of the MeOH solution with the catalytically active centres of the anode electrode layer can take place owing to the low water tightness (or the higher water permeability). The anode backings according to the invention permit rapid diffusion of the aqueous methanol solution, good separation of the carbon dioxide formed and good contact of the reactants with the ionomer membrane. At the same time, the good water tightness of the cathode backing prevents the MEU from drying out too rapidly. However, other explanations are also possible.

The total content of water repellent material is in the range from 2 to 10 wt.-% for anode backings and in the range from 10 to 30 wt.-% for cathode backings (based in each case on the total weight). The water repellency can be imparted by all known methods. The method in which a commercial PTFE dispersion is mixed with distilled water and the carbon fibre papers are then immersed in the prepared dispersion is customary. The coated carbon fibre paper is then dried in a drying oven. For fusion/sintering of the applied PTFE, the backings which have been rendered water repellent can be sintered in a drying oven at above 300° C. The content of water repellent is as a rule determined gravimetrically, i.e. by weighing the backing before and after the water repellency treatment.

After the water repellency treatment, the coating of the cathode backing with a compensating layer is effected. The microlayer or compensating layer contains, as a rule, conductive carbon black and PTFE in any desired compositions. It can be applied by customary coating methods, for example by doctor blade coating or screen printing. Backing inks which, in addition to solvents, can also contain various pore formers for adjusting the porosity are prepared for this purpose. Owing to the additional proportion of PTFE in the microlayer, the cathode backings have a higher total content of water repellent (from 10 to 30 wt.-%, based on the total weight). In this case, the total weight is likewise determined gravimetrically from the weight increase of the backing after application of the microlayer, the proportion of PTFE in the backing ink formulation being included in the calculation. The microlayer generally has a layer thickness of from 5 to 30 micron, preferably from 10 to 20 micron.

The coating of the anode and cathode backings with electrocatalysts is effected using catalyst inks with the aid of customary coating methods (for example screen printing, spray methods, doctor blade coating, etc.). After coating, the backing layers are dried for removal of the solvent fractions.

DETAILED DESCRIPTION OF INVENTION The following examples are intended to explain the invention in more detail.

EXAMPLES

Example 1

Membrane Electrode Unit According to the Invention ($WT_{Anode} < WT_{Cathode}$)

a) Production of the anode backing: The catalyst ink for the anode, consisting of a PtRu/C supported catalyst (80 wt.-% of PtRu on carbon black, 52.8 wt.-% of Pt, 27.2 wt.-% of Ru; from Umicore), Nafion® dispersion (10 wt.-% in water) and an organic solvent (dipropylene glycol) is applied by means of screen printing to a backing layer (Sigracet 30 BA type; from SGL Carbon AG, Meitingen; content of water repellent 5 wt.-%; no microlayer), the water tightness WT of which (measured according to DIN EN 20811) corresponds to a hydrostatic pressure of 19 mbar. The noble metal loading of this anode backing produced in this manner is 4 mg of PtRu/cm$^2$ (=2.64 mg of Pt/cm$^2$ and 1.36 mg of Ru/cm$^2$); its active area is 50 cm$^2$.

b) Production of the cathode backing: The catalyst ink for the cathode, consisting of a Pt supported catalyst (60 wt.-% of Pt on carbon black, from Umicore), Nafion® dispersion (10 wt.-% in water, from DuPont) and an organic solvent (dipropylene glycol) is applied by means of screen printing to a backing layer (Sigracet 30 BC type; from SGL Carbon AG; content of water repellent 11.5 wt.-%; with microlayer), the water tightness WT of which (measured according to DIN EN 20811, see above) corresponds to a hydrostatic pressure of 41 mbar. The loading of this cathode backing produced in this manner is 2 mg Pt/cm$^2$, and its active area is 50 cm$^2$.

c) Production of the membrane electrode unit: In the next operation, the two backings are laminated with the opposite sides of an ionomer membrane (Nafion® N117, from DuPont) and the resulting five-layer membrane electrode unit is installed in a DMFC fuel cell. The backings used correspond to the relationship $$WT_{Anode} < WT_{Cathode}$$

with $C = WT_{Anode}/WT_{Cathode} = 0.46$.

The total noble metal loading of the MEU is 6 mg of noble metal/cm$^2$. Very good performance values which are more than a factor of 2 above those of the comparative examples are obtained. Test conditions and results are summarized in table 1.

Comparative Example 1 (CE 1)

Membrane Electrode Unit having Backings which have the Same Water Tightness ($WT_{Anode} = WT_{Cathode}$)

The production of the anode backing is effected in principle as described in example 1, but the type Sigracet 30 BC (from SGL) is used as the backing layer. The content of water repellent is 11.5 wt.-%, and a microlayer is present. The water tightness WT (measured according to DIN EN 20811, see above) corresponds to a hydrostatic pressure of 41 mbar. The noble metal loading of this anode backing produced in this manner is 4 mg of PtRu/cm2 (=2.64 mg of Pt/cm2 and 1.36 mg of Ru/cm$^2$).

The production of the cathode backing is effected as described in example 1. Here too, Sigracet 30 BC is used as backing material (the water tightness WT corresponds to 41 mbar). In the next operation, the two backings are laminated with the opposite sides of an ionomer membrane (Nafion® N117, from DuPont) and the resulting five-layer membrane electrode unit is installed in a DMFC single cell. The active cell area is 50 cm$^2$. The backings used correspond to the relationship $$WT_{Anode} = WT_{Cathode}$$

with $C = WT_{Anode}/WT_{Cathode} = 1$.

The performance values obtained are substantially below those of example 1 according to the invention. Test conditions and results are summarized in table 1.

Comparative example 2 (CE 2)

Membrane electrode unit having backings which have different water tightness ($WT_{Anode} > WT_{Cathode}$)

The production of the anode backing is effected as described in example 1, but Sigracet 30 BC (from SGL; content of water repellent 11.5 wt.-%; with microlayer) is used as the backing layer. The water tightness WT corresponds to a hydrostatic pressure of 41 mbar. The noble metal loading is 4 mg of PtRu/cm$^2$.

The production of the cathode backing is effected as described in example 1, but Sigracet 30 BA (from SGL, content of water repellent 5 wt.-%; without microlayer) is used as backing material. The water tightness (WT) corresponds to a hydrostatic pressure of 19 mbar.

In the next operation, the two backings are laminated with the opposite sides of an ionomer membrane (Nafion® N117, from DuPont) and the resulting five-layer membrane electrode unit is built in a DMFC single cell having an active cell area of 50 cm$^2$. The backings used correspond to the relationship $$WT_{Anode} < WT_{Cathode}$$

with $C = WT_{Anode}/WT_{Cathode} = 2,16$.

The DMFC performance values obtained are substantially below those of example 1 according to the invention. Test conditions and results are summarized in table 1.

ELECTROCHEMICAL TESTS

The electrochemical tests are conducted in a DMFC single cell having an active cell area of 50 cm$^2$. A 1 molar aqueous methanol solution is used on the anode, and air is used as cathode gas. The MeOH flow rate is 3 ml/min; the air stoichiometry is 2.5 at 100 mA/cm$^2$. The cell temperature is 70° C. The measured cell voltages are summarized by way of example for the current density of 280 mA/cm$^2$ in table 1. It is evident that the membrane electrode unit from example 1, produced according to the invention and having $WT_{Anode} < WT_{Cathode}$, gives a substantially better electrical performance in comparison with the comparative examples (CE 1 and CE 2).

TABLE 1

Comparison of cell voltage [mV] and power density [mW/cm$^2$] of the membrane electrode units (DMFC single cell, 50 cm$^2$, methanol/air operation, flow rate 3 ml/min; air stoichiometry 2.5 at 100 mA/cm$^2$; cell temperature 70° C., current density 280 mA/cm$^2$).

| Examples | $C = WT_{Anode}/WT_{Cathode}$ | Cell voltage U [mV] at 280 mA/cm$^2$ | Power density P [mW/cm$^2$] |
|---|---|---|---|
| Example 1 | C = 0.42 | 311 | 87 |
| Comparative example 1 (CE 1) | C = 1 | 147 | 41 |
| Comparative example 2 (CE 2) | C = 2.16 | 113 | 35 |

The invention claimed is:

1. Membrane electrode unit for direct methanol fuel cells (DMFC), comprising five layers, namely an ion-conducting membrane, at least one anode electrode layer, at least one cathode electrode layer, at least one anode backing and at least one cathode backing, wherein,
   said ion-conducting membrane is in the middle, the two backings are attached on either side of the membrane and the electrode layers are present between the membrane and the respective backings,
   the anode backing has no compensating layer between a backing surface of the anode backing and the anode electrode layer,
   the anode backing has a lower water tightness (WT) than the cathode backing, and
   the following is applicable:

$$WT_{Anode} < WT_{Cathode}$$

and a quotient $C = WT_{Anode}/WT_{Cathode} < 1$, and wherein the anode backing and the cathode backing include water repellent material, with a total content of water repellent material for the anode backing being in a range from 2 to 10 wt.-%, and a total content of water repellent material for the cathode backing being in a range from 10 to 30 wt.-%, based in each case on the total weight.

2. Membrane electrode unit according to claim 1, wherein the values for the quotient C are in the range from 0.01 to 0.99.

3. Membrane electrode unit according to claim 1, wherein the anode backing has a higher total pore volume $V_{Tot}$ than the cathode backing.

4. Membrane electrode unit according to claim 1, wherein the anode backing has a total pore volume $V_{Tot(Anode)}$ in the range from 2.5 to 4.5 ml/g and the cathode backing has a total pore volume $V_{Tot(Cathode)}$ in the range from 0.5 to 2.5 ml/g.

5. Membrane electrode unit according to claim 1, wherein the anode backing and/or the cathode backing is/are comprised of porous, electrically conductive materials.

6. Membrane electrode unit according to claim 1, wherein the anode electrode layer and the cathode electrode layer are applied to the ion-conducting membrane.

7. Membrane electrode unit according to claim 1, wherein the anode electrode layer and/or the cathode electrode layer contains catalytically active, finely divided noble metals.

8. Membrane electrode unit according to claim 1, wherein the ion-conducting membrane comprises an organic ionomer.

9. Membrane electrode unit according to claim 1, furthermore comprising sealing materials, protective films, reinforcing materials and/or rims.

10. Membrane electrode unit according to claim 1, wherein the values for the quotient C are in the range from 0.4 to 0.9.

11. Membrane electrode unit according to claim 5, wherein the porous, electrically conductive materials are members of the group consisting of metal nets, metal lattices, graphitized or carbonized carbon fibre papers, carbon fibre nonwovens, woven carbon fibre fabrics and combinations thereof.

12. Membrane electrode unit according to claim 7, wherein said noble metals are members selected from the group consisting of platinum, palladium, rhodium, ruthenium, gold and combinations thereof.

13. Membrane electrode unit according to claim 8, wherein said organic ionomer is a member selected from the group consisting of fluorinated polymeric sulphonic acid derivatives, sulphonated polyetherketones, sulphonated polyaryl ketones, doped polysulphones, doped polybenzimidazoles and inorganic ionomers.

14. A direct methanol fuel cell (DMFC) containing the membrane electrode unit according to claim 1.

15. Membrane electrode unit for direct methanol fuel cells (DMFC), comprising five layers, namely an ion-conducting membrane, at least one anode electrode layer, at least one cathode electrode layer, at least one anode backing and at least one cathode backing, wherein, said ion-conducting membrane is in the middle, the two backings are attached on either side of the membrane and the electrode layers are present between the membrane and the respective backings, the anode backing has no compensating layer between a backing surface of the anode backing and the anode electrode layer, the anode backing has a lower water tightness (WT), defined as a hydrostatic pressure according to DIN EN 20811, than the cathode backing, and the following is applicable:

$WT_{Anode} < WT_{Cathode}$ and a quotient $C = WT_{Anode}/WT_{Cathode} < 1$, and wherein the anode backing and the cathode backing include water repellent material, with a total content of water repellent material for the anode backing being in a range from 2 to 10 wt.-% and a total content of water repellent material for the cathode backing being in a range from 10 to 30 wt.-%, based in each case on the total weight.

16. Membrane electrode unit according to claim 15, wherein the anode backing has a higher total pore volume $V_{Tot}$, defined by means of Hg porosimetry according to DIN 66133, than the cathode backing.

17. Membrane electrode unit according to claim 15, wherein the anode backing has a total pore volume $V_{Tot(Anode)}$, defined by means of Hg porosimetry according to DIN 66133, in the range from 2.5 to 4.5 ml/g and the cathode backing has a total pore volume $V_{Tot(cathode)}$ in the range from 0.5 to 2.5 ml/g.

18. Membrane electrode unit according to claim 15, wherein the values for the quotient C are in the range from 0.4 to 0.9.

19. A direct methanol fuel cell (DMFC) containing the membrane electrode unit according to claim 15.

20. Membrane electrode unit according to claim 1, wherein the anode electrode layer is applied to the anode backing and the cathode electrode layer is applied to the cathode backing.

21. Membrane electrode unit according to claim 1, wherein the anode electrode layer and the cathode electrode layer are applied to the ion-conducting membrane, and to the anode backing and cathode backing, respectively.

22. Membrane electrode unit according to claim 1, wherein the anode backing has no compensating layer.

23. Membrane electrode unit according to claim 15, wherein the anode backing has no compensating layer.

* * * * *